United States Patent [19]

Jörg

[11] 4,074,590
[45] Feb. 21, 1978

[54] ARRANGEMENT FOR COOLING A LUBRICANT-FILLED, FINNED GEAR CASE BY MEANS OF A BUILT-IN FAN

[76] Inventor: Helmut Jörg, Raffaelgasse 25, 1200 Vienna, Austria

[21] Appl. No.: 601,999

[22] Filed: Aug. 5, 1975

[30] Foreign Application Priority Data

Aug. 7, 1974 Austria .................. 6446/74

[51] Int. Cl.² .......................................... F16H 57/02
[52] U.S. Cl. ................... 74/606 A; 165/122
[58] Field of Search ............. 60/337; 74/50, 425, 74/606 A; 165/122, 124, 125; 192/112, 113 A; 418/101

[56] References Cited

U.S. PATENT DOCUMENTS

| 1,327,080 | 1/1920 | Brown | 60/337 |
|---|---|---|---|
| 2,391,186 | 12/1945 | Noble | 74/606 A |
| 2,469,259 | 5/1949 | Burgess | 165/122 X |
| 2,511,479 | 6/1950 | Olah | 74/606 A X |
| 2,548,805 | 4/1951 | Moir et al. | 74/606 A |
| 3,045,430 | 7/1962 | Becker | 60/337 |
| 3,353,591 | 11/1967 | Zak | 165/122 X |

FOREIGN PATENT DOCUMENTS

| 436,065 | 3/1912 | France | 165/122 |
|---|---|---|---|
| 2,534,173 | 2/1976 | Germany | 74/425 |
| 450,542 | 4/1968 | Switzerland | 165/122 |
| 493,698 | 10/1938 | United Kingdom | 74/606 A |

*Primary Examiner*—Samuel Scott
*Assistant Examiner*—Carl F. Pietruszka
*Attorney, Agent, or Firm*—Blanchard, Flynn, Thiel, Boutell & Tanis

[57] ABSTRACT

A fan-cooled gear case has a fan located in a recess and a system of cool channels extending over all faces of the gear case, some of the channels being connected to the inlet side of the fan, while others are connected to the outlet side of the fan. Where necessary, the channels are covered over and have their inlets and outlets situated on the opposite side of the casing to the fan. The fan is driven by a shaft of the gearing.

6 Claims, 4 Drawing Figures

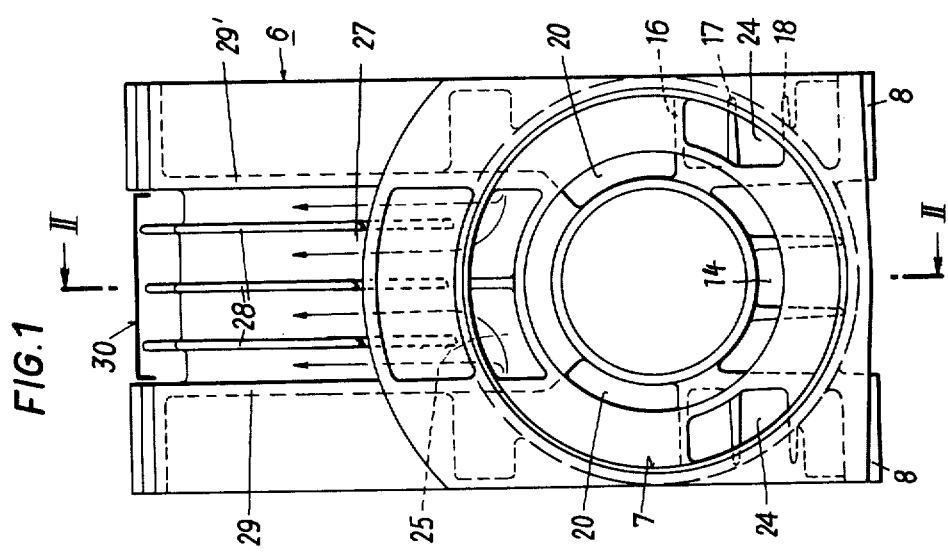
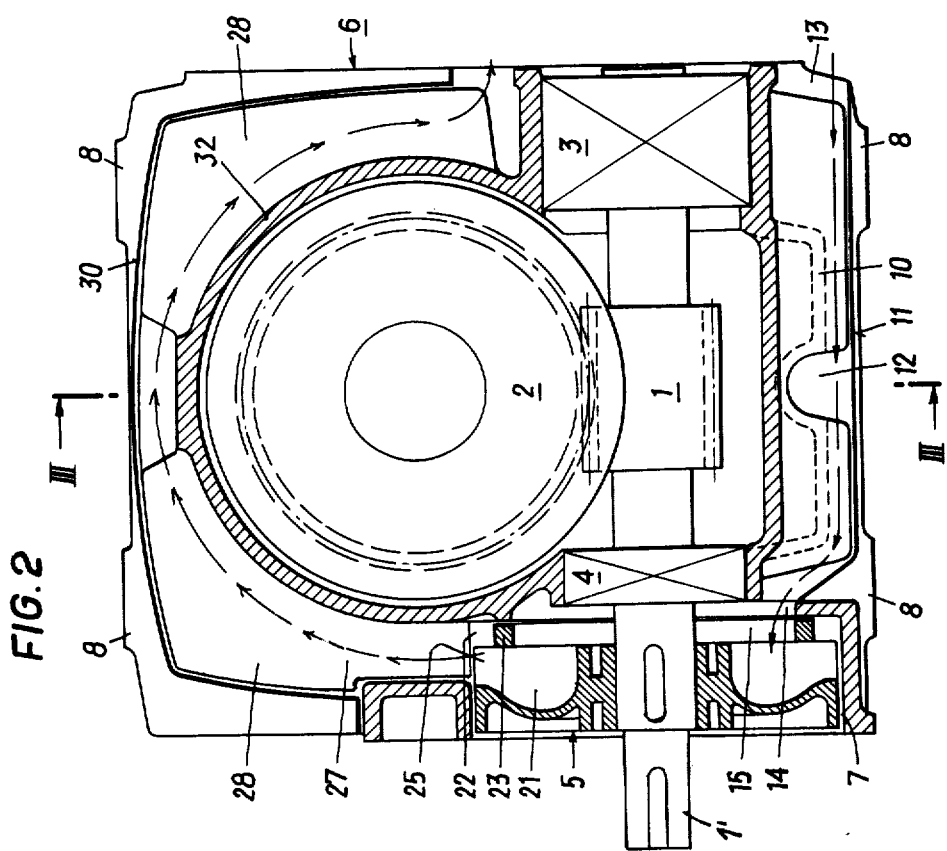

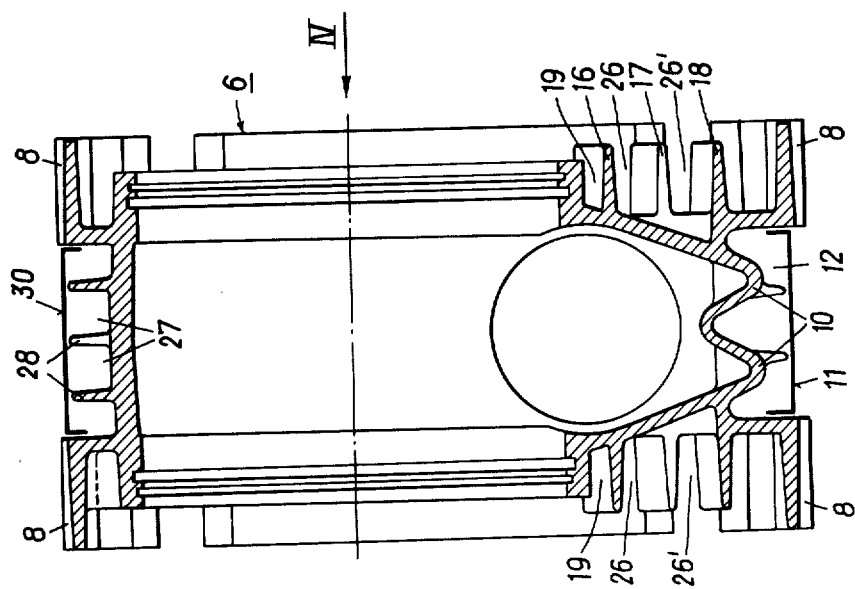
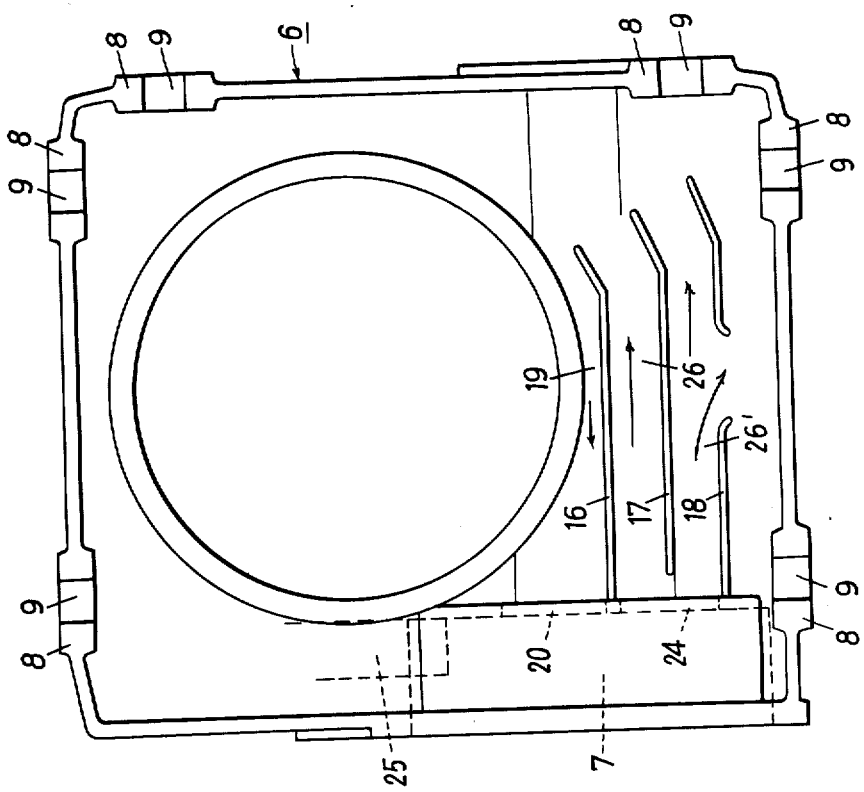

4,074,590

ARRANGEMENT FOR COOLING A LUBRICANT-FILLED, FINNED GEAR CASE BY MEANS OF A BUILT-IN FAN

BACKGROUND OF THE INVENTION

The invention relates to an arrangement for cooling a lubricant-filled, finned gear case by means of a built-on fan.

In order to be able to accommodate gears, in particular worm gears or drives of rather high efficiency, in a relatively small space in a lubricant-filled case or housing, care must be taken that air flows around the outside of the case and this is so cooled that, for example, the mineral oil employed as lubricant and in which the gear runs never acquires a temperature above about 110° C, at which decomposition of the oil would occur.

PRIOR ART

It is known to provide the case externally with cooling fins for this purpose. It is furthermore known to build a fan onto the case and cause the air issuing therefrom or even the air drawn in by the fan to flow into passages formed by fins on the case. Such an arrangement, however, meets the desired purpose only incompletely, since it is not possible in this way to cause the entire surface of the case to be swept by streams of air and consequently cooled and since, moreover, the heat capacity of the air flowing over the case is utilized only incompletely.

OBJECT OF THE INVENTION

An object of the invention is to cool the entire surface of the case by means of moving air and utilize the heat capacity of the latter in optimum manner. In this process, therefore, as small a volume of air as possible should come into contact with as large an area of the case as possible and sufficient cooling by removal of heat should be achieved with as small an air delivery capacity of the fan as possible. Finally, minimum space requirements should be obtained for the case for a given efficiency of the gear.

BRIEF DESCRIPTION OF THE INVENTION

According to the invention, in an arrangement of the kind mentioned at the beginning, this is achieved in that at least partially closed channels provided on the gear case and formed by cooling fins and, if necessary, covers therefore adjoin both the suction zone and the discharge zone of the fan in such manner that both the air flowing to the fan and the air flowing off therefrom is conveyed in its entirety over the surface of the case. Advantageously, cooling air channels adjoining the suction zone and the discharge zone of the fan are provided at all six outer surfaces of the approximately parallelepipedal case.

Preferably, the fan impeller is mounted completely in a recess in the gear case and, on the one hand, openings for the air drawn in and, on the other hand, openings for the air flowing off are provided in the wall defining this recess.

BRIEF DESCRIPTION OF THE DRAWINGS

An embodiment of the invention, namely a case for a worm gear with a built-on fan and intended to be filled with oil, is described more fully hereinafter by way of example with reference to the drawing in which:

FIG. 1 shows the case in elevation as seen from the narrow side intended to receive the fan (without the fan impeller);

FIG. 2 is a section on the line II—II in FIG. 1, the worm, the worm wheel and the fan impeller being shown;

FIG. 3 is a section on the line III—III in FIG. 2; and

FIG. 4 is a view in the direction of the arrow IV in FIG. 3.

DESCRIPTION OF PREFERRED EMBODIMENT

The case shown is intended for a worm gear which is shown (diagrammatically) only in FIG. 2 and comprises a worm 1 and a worm wheel 2, the worm being mounted in the gear case 6 in bearings 3, 4 on both ends thereof. The bearings for the worm wheel 2 are not shown. The shaft of the worm 1 is driven from the left end (FIG. 2); where a motor is keyed onto a journal 1', and then carries the impeller of of a fan 5. The impeller does not have its own housing, but is installed completely in a corresponding recess 7 in the case 6, so that it does not project beyond the outer face of the case 6. The substantially parallelepipedal case 6 is formed with slightly projecting lugs 8 close to its corners, the lugs having holes 9 for fixing the case to a support by means of headed bolts.

Between the lugs 8 there are depressions in which are arranged cooling fins over which the streams of air arriving at the fan 5 and leaving the fan 5 are conveyed.

Provided on the underside of the case 6 in a depression are two fins 10 extending parallel to the axis of the worm, these fins being hollow and constituting at the same time the sump for the oil filling of the case 6. The space accommodating these fins 10 may be covered at the bottom by a sheet-metal plate 11. This channel or passage 12 formed in this way terminates on the right (in FIG. 2) in an opening 13 leading to the outside and adjoins on the left an opening 14 in the case wall which is adjacent the annular suction opening 15 of the impeller of the fan 5.

As can be seen from FIGS. 3 and 4, on the lower part of the side walls of the case 6 three horizontally extending fins 16, 17 and 18 are arranged on both sides, these fins adjoining the right-hand wall (FIG. 4) of the fan 5, but not continuing through to the other wall, but terminating before it. The channel 19, which is open at the end on both sides between the uppermost fin 16 and the projecting case wall adjoins in each case an opening 20 provided on both sides in the fan case wall which is again adjacent the suction opening 15 of the impeller of the fan 5.

As is apparent from the foregoing explanations, air is drawn in by the fan 5 through the channels 12 and 19 and through the openings 14 and 20, whereby cooling of the bottom wall and of part of the side walls of the gear case 6 by the air drawn in is achieved.

The air drawn in at the openings 14 and 20 is accelerated radially by the blades 21 of the impeller of the fan 5 and delivered into the outlet space 22, which is separated from the suction opening 15 of the impeller by the annular part 23 thereof. Further openings 24 and 25 in the case or housing wall of the impeller join up with or adjoin this outlet space 22. The openings 24 are located on both sides below the openings 20 and adjoin the channels 26 and 26' between the fins 17 and 18 and the defining case wall parts. Part of the delivered cooling air therefore flows through these channels 26, 26' on both sides over the surface of the case 6 which is to be cooled.

The opening 25 arranged in the middle of the wall of the fan housing adjoins further channels 27 formed by fins 28 which are cast integrally on the case in the depression between the wall parts 29, 29' defining the case laterally in the upper half thereof. These fins 28 continue over the top of the case 6 and the upper part of that wall of the case 6 which is disposed opposite the fan 5. In order to compel the cooling air delivered by the fan 5 to flow between these fins 28 to the end thereof, the fins are covered on the outside by a sheet metal plate 30, so that a flow passage for cooling divided into four channels is formed which extends along the cylindrical wall 32 of the case over more than 180°.

Consequently, on the one hand the air flowing to the fan 5 is carried over the surface to be cooled and, in addition, the air flowing off from the fan 5 is compelled to flow both at the bottom on both sides (channels 26, 26') and at the top (cylindrical wall 32) over the surface to be cooled, so that streams of air sweep over almost the entire gear case and the best possible utilization of the cooling air producing the removal of heat is achieved.

In consequence of this increased absorption of heat by the cooling air in comparison with known gears, for a given transmission efficiency of the gear, which produces a certain value of frictional heat, a fan of such small dimensions can be employed that it can be installed in a axial recess in the case end wall, which has not been possible heretofore. The result of this is the further advantage that that wall in which the fan is mounted is defined on the outside by surfaces which are just as plane as the other walls. Since, as described in the embodiment, the inflowing and outflowing cooling air flows into and out of the fan on the same end, the additional advantage is obtained that the case wall bearing the fan can be used for mounting the driving motor and for fixing the gear case to an adjacent supporting structural part. The case therefore needs to be accessible only on the opposite end from the fan, without the cooling of the case being impaired.

I claim:

1. A fan-cooled, lubricant filled, gear case unit, comprising:
    a stationary gear case of substantially rectangular shape having a top and bottom, opposed ends and opposed sides, said case containing gearing including a shaft rotatably extending out through one end wall of said gear case;
    a single fan wheel connected to said shaft, said one end wall of said gear case including a recess through which said shaft extends, said fan wheel being contained within said recess for rotation with respect thereto, the outer rim of said recess and the outer face of said one end wall being coplanar;
    the top, bottom and side walls of said gear case all being provided with rib-like projections defining air channels between said projections, and means covering the outside of said projections on said top, bottom and ends of said case, a first group of said air channels communicating with the suction side of said fan wheel and the remaining group of said air channels communicating with the pressure side of said fan wheel.

2. The device of claim 1 in which said recess includes a wall portion which bounds the inside of said gear case, said recess having a further wall portion having an air inlet opening adjacent the near central part of said fan wheel and communicating with said first group of air channels for drawing air therefrom into said fan wheel, said recess wall portion having an air outlet opening adjacent the outer part of said fan wheel and communicating with said remaining air channels for expelling air from said fan wheel thereinto.

3. The device of claim 2 in which said shaft extends substantially through the length of said gear case and is supported on opposite end walls of said gear case, said fan wheel being on one end of said shaft, said first and remaining groups of air channels having their inlets and outlets, respectively, adjacent said other end of said shaft, said rib-like projections all extending along the surface of said gear case from said recess substantially to the other end of said shaft.

4. The device of claim 3 including a further shaft spaced above and extending transverse of said first mentioned shaft and drivingly connected thereto through said gearing, said gear case including a semicircular cross section central portion extending above the level of said recess in upwardly and substantially coaxially arched relation over said further shaft and substantially rectangular cross section end portions flanking said central portion axially of said further shaft and extended radially outwardly beyond said semicircular central portion, ones of said rib-like projections extending circumferentially along said semicircular portion between said rectangular end portions substantially from one end to the other of said first mentioned shaft, said last mentioned projections having a substantially rectangular outer edge profile and a semicircular inner edge profile.

5. The device of claim 2 in which said fan wheel is closed at its outer end and comprises plural circumferentially arranged blades extending axially inward and connected by a radially narrow annular part cooperative with the end of said recess to radially separate the air inlet and air outlet portions of the fan wheel, the end wall of said recess having a circumferential array of said air inlet openings and of said air outlet openings with said annular part of said fan wheel disposed radially therebetween.

6. The device of claim 2 in which said gear case has one pair of opposed side walls flanking said shaft and carrying oppositely directed and vertically stacked sets of horizontal rib-like projections extending from said recess substantially the full width of said flanking walls, lower ones of said horizontal projections bounding an air outlet channel from said recess and the upper said horizontal projection bounding an air inlet channel to said recess.

* * * * *